April 4, 1950 G. E. ATKINS ET AL 2,502,915
CONTROL KNOB DEVICE
Filed Sept. 25, 1946

INVENTORS G. E. ATKINS
E. D. MEAD
BY J. MacDonald
ATTORNEY

Patented Apr. 4, 1950

2,502,915

UNITED STATES PATENT OFFICE 2,502,915

CONTROL KNOB DEVICE

George E. Atkins, Glen Ridge, and Edward D. Mead, Caldwell, N. J., assignors to Bell Telephone Laboratories, Incorporated, New York, N. Y., a corporation of New York Application September 25, 1946, Serial No. 699,144

7 Claims. (Cl. 74—553)

1

This invention relates to knob devices and more particularly to rotatable knob devices operable as a means to facilitate the rotation of shafts.

An object of the invention is to provide a rotatable knob device which may be used at times to facilitate rotation of a shaft and which at other times will hold the shaft against undesired rotation.

Another object of the invention is to provide a control knob suitable for use in connection with an apertured control panel used outdoors or in areas subject to moisture conditions.

A feature of the invention resides in a yieldable, resilient member provided in the knob device.

The knob device provides a means for facilitating the rotation of a rotatable member in a control device such, for instance, as the rotor shaft of an electrical potentiometer, switch, or variable air condenser.

The yieldable, resilient member is constructed and arranged so that it may normally engage a fixed support to hold the knob device against rotation and may be withdrawn from engagement with the fixed support to permit rotation of the knob device.

The yieldable, resilient member is also constructed and arranged to form a moisture excluding seal around a point of emergence of a control shaft extending through an apertured control panel or other apertured fixed surface.

In control apparatus involving an electrical switch, potentiometer or other device in which a rotatable shaft is provided to operate a movable

2 part in the device, to condition the device as required, the rotor shaft will sometimes be undesirably rotated by vibration of the device or by unwarranted rotation of the rotor shaft. Rotation of the rotor shaft under such conditions will cause an undesired change in the condition of the device controlled through the shaft.

In the present invention a control knob secured to a rotatable shaft is equipped with a yieldable resilient member operable to engage a fixed control panel or other fixed surface to prevent undesired or unintentional rotation of the control knob and shaft. The yieldable, resilient member may be withdrawn from and held withdrawn from the fixed surface or panel to permit rotation of the rotatable shaft simply by applying an outward pull on the control knob. When the outward pull on the control knob is discontinued the yieldable, resilient member automatically moves into engagement with the fixed surface or panel to hold the control knob and rotatable shaft against undesired movement.

The yieldable, resilient member when in engagement with the fixed surface also serves as a moisture excluding seal around the aperture in the control panel or other fixed surface through which the rotatable shaft projects.

Figure 1:
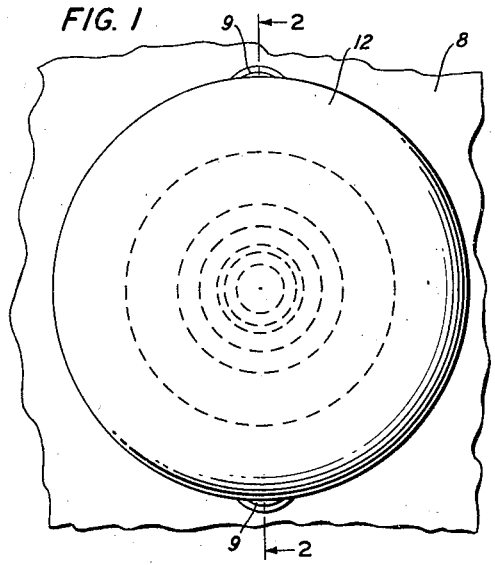
Fig. 1 is a plan view of a knob device embodying the invention, the knob device being mounted relative to a fixed surface such, for instance, as a panel on an electrical apparatus support.
Figure 2:
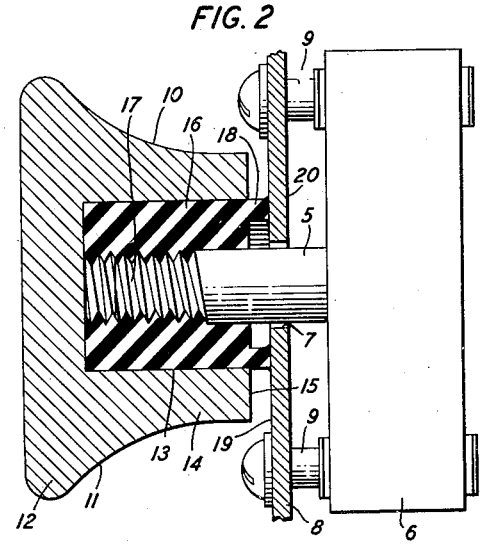
Fig. 2 is a side view, partly in section, of the knob device shown in Fig. 1, mounted on a rotatable shaft of a control device and having the yieldable, resilient member in the knob device in engagement with a fixed support.

As shown in Fig. 2 the rotatable shaft 5 of a potentiometer 6 extends through an aperture 7 formed in a fixed panel 8 on which the potentiometer 6 is supported by suitable means 9. A control knob 10 embodying the invention is mounted on and secured to the rotatable shaft 5. The control knob 10 comprises a hand knob 11 having an enlarged outer end portion 12. A recess 13 is formed in the body portion 14 of the hand knob 11 and in the central portion thereof, the recess 13 extending inwardly of the hand knob 11 from the back surface 15. Disposed in the recess 13 is an insert 16 of yieldable, resilient material but having sufficient stiffness to serve as a support for the hand knob 11. The insert 16 is apertured and internally threaded to receive the male threaded end 17 of the rotatable shaft 5 which may be secured to the insert 16 as required to prevent relative rotation of the insert 16 and the rotatable shaft 5 after the insert 16 has been mounted on the rotatable shaft 5. The insert 16 is secured to the hand knob 11 to prevent relative rotation of the hand knob 11 and the insert 16. Semihard rubber or other suitable yieldable, resilient material may be used as the material for the insert 16. A flange portion 18 is provided on the insert 16 to extend outwardly beyond and normal to the plane of the back surface 15 of the hand knob 11. In mounting the control knob 10 with its insert 16 on the rotatable shaft 5 the flange portion 18 of the insert 16 is pressed into close engagement with the outer face 19 of the apertured panel 8 which is stationary and sufficient pressure is developed in the insert 16 to normally maintain the flange portion 18 in close and pressure engagement with the outer face 19 of the apertured panel 8. The flange portion 18 surrounds the point of location of the aperture 7 in the panel 8 and serves to prevent moisture from passing from the outer face 19 of the apertured panel 8 to the inner face 20 of the apertured panel 8 by way of the aperture 7. Since the insert 16 is secured to the hand knob 11 and to the rotatable shaft 5 and the flange portion 18 of the insert 16 is normally in pressure engagement with the outer face 19 of the panel 8 the control knob 10 and the rotatable shaft 5 are not normally free to rotate, the insert 16 in cooperation with the fixed panel 8 serving in the nature of a holding brake means for the rotatable shaft 5.

When rotation of the rotatable shaft 5 is required the flange portion 18 of the insert 16 may be withdrawn from pressure engagement with the panel 8 by applying a sufficient pull on the control knob 10 and outwardly with respect to the panel 8. Since the insert 16 is made of yieldable, resilient material and forms a yieldable and resilient connection between the hand knob 11 and the rotatable shaft 5 a considerable outward pull may be applied to the hand knob 11 without subjecting the rotatable shaft 5 to an appreciable outward pull. While the outward pull is maintained on the hand knob 11 the rotatable shaft 5 may be readily rotated by rotating the control knob 10. When the outward pull on the hand knob 11 is discontinued the pressure developed in the insert 16 will cause the flange portion 18 to return to close engagement with the panel 8 to retain the control knob 10 and the rotatable shaft 5 against undesired further rotation.

Figure 3:
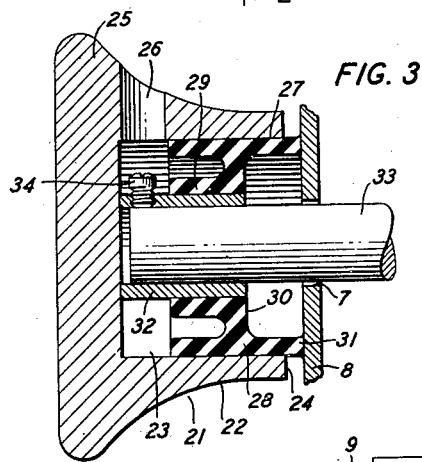
Fig. 3 is a side view, in section, of a modification of the knob device supported on a shaft extending through a fixed plate.

In the modification of the invention shown in Fig. 3 the control knob 21 comprises a hand knob 22 having a recess 23 formed therein and extending through the back wall 24. A flared outer end portion 25 is provided on the hand knob 22 and a lateral aperture 26 formed in the hand knob 22 extends into communication with the base of the recess 23. Mounted in the recess 23 and concentric with the axis of the hand knob 22 is an insert 27 of yieldable resilient material. The insert 27 is tubular in form and comprises an outer wall 28 joined to an inner wall 29 by a connecting wall 30. The outer and inner walls 28 and 29 respectively are concentric, the outer ends of the walls 28 and 29 are in a common plane and the inner wall 29 extends from the outer end of the insert 27 only about halfway into the space defined by the outer wall 28. The connecting wall 30 is located about midway of the outer and inner ends of the outer wall 28 and connects the inner end of the inner wall 29 to the mid-section of the outer wall 28.

The insert 27 is securely mounted in the recess 23 in the hand knob 22 and so that an end portion 31 of the outer wall 28 of the insert 27 extends rearwardly of and beyond the back wall 24 of the hand knob 22. The major portion of the outer wall 28 of the insert 27 is secured to the hand knob 22 by means of cement or other suitable securing means. The inner wall 29 of the insert 27 is dimensioned to receive a tubular member 32 constructed and arranged to receive a rotatable shaft 33 extending through an aperture 7 in a fixed panel 8. The tubular member 32 is secured to the inner wall 29 of the insert 27 and is equipped with a set screw 34 operating to secure the tubular member 32 to the rotatable shaft 33.

The control knob 21 is securely mounted on the rotatable shaft 33 and so that the end portion 31 of the insert 27 normally bears with pressure against the outer face of the fixed panel 8, the engagement of the insert 27 against the panel 8 being sufficient to prevent relative rotation of the control knob 21 and the shaft 33 unless considerable torque is applied to the parts. When it is desired to rotate the rotatable shaft 33, the control knob 21 may be pulled outwardly of the rotatable shaft 33 sufficient to move the end portion 31 of the insert 27 away from the fixed panel 8. While the outward pull is maintained on the control knob 21, the rotatable shaft 33 may be rotated by rotating the control knob 21. The outward pull on the control knob 21 causes the development of some pressure in the insert 27 and particularly in the connecting wall 30. The pressure developed in the insert 27 will cause the end portion 31 of the insert 27 to again engage the fixed panel 8 when the outward pull on the control knob 21 is discontinued.

Figure 4:
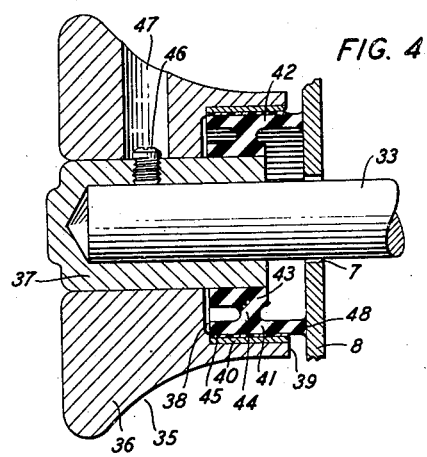
Fig. 4 is a side view, in section, of another modification of the knob device supported on a shaft and shows the yieldable, resilient member in engagement with a fixed surface.
Figure 4A:
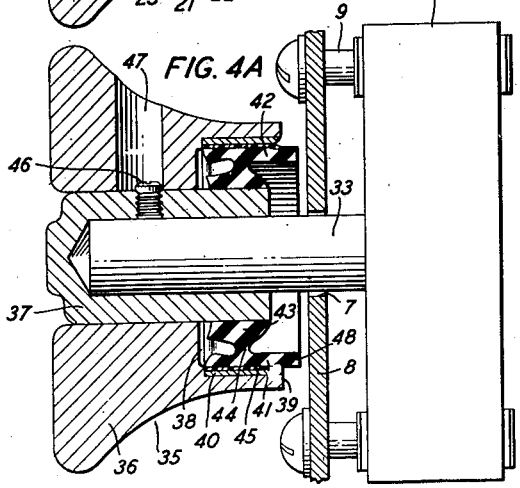
Fig. 4A is a side view, partly in section, of the device shown in Fig. 4 but with the device mounted on a device to be controlled thereby and shows the yieldable, resilient member withdrawn from a fixed surface.

In the modification of the invention shown in Figs. 4 and 4A the control knob 35 comprises a centrally apertured hand knob 36 supported for longitudinal movement on a cap-type hub 37. A recess 38 is formed in the hand knob 36, the recess 38 opening to the rear 39 of the hand knob 36. Located in the recess 38 and serving as an inner liner therefor is a band 40 which is staked or otherwise secured to the hand knob 36. An insert 41 of yieldable, resilient material is located in the recess 38 and inwardly of the band 40. The insert 41 is tubular in form and comprises an outer wall 42 joined to an inner wall 43 by a connecting wall 44. The outer and inner walls 42 and 43 respectively are concentric and are spaced from each other by the connecting wall 44. The outer ends of the walls 42 and 43 are in a common plane and the inner wall 43 extends from one end of the insert 41 to a point slightly beyond the connecting wall 44 which is located at a point almost central with respect to the length of the wall 42. The major portion of the outer surface of the outer wall 42 is secured to the inner surface of the band 40 by suitable means such, for instance, as a layer 45 of adhesive material. The inner surface of the inner wall 43 is secured to the cap-type hub 37, constructed to receive the rotatable shaft 33 which extends through the aperture 7 in the fixed panel 8. The cap-type hub 37 carries a set screw 46 by means of which the cap-type hub 37 may be secured to the rotatable shaft 33, access to the set screw 46 being had through an aperture 47 formed in the hand knob 36. A portion 48 of the outer wall 42 is arranged to extend rearwardly beyond the back 39 of the hand knob 36.

As shown in Fig. 4 the control knob 35 is securely mounted on the rotatable shaft 33 and so that the portion 48 of the outer wall 42 of the insert 41 bears with some pressure against the outer face of the fixed panel 8. A desired pressure of the insert 41 against the fixed panel 8 may be attained by loosening the set screw 46 and pressing the control knob 35 toward the fixed panel 8 and tightening the set screw 46 while the pressure is applied. When the insert 41 is bearing against the fixed panel 8 the wall 42 of the insert 41 serves as a barrier against the entrance of moisture through the aperture 7 by way of the front of the fixed panel 8. Under this condition the insert 41 also serves in the nature of a holding brake to prevent free rotation of the control knob 35 and the shaft 33. When rotation of the shaft 33 is required the hand knob 36 may be pulled outwardly relative to the fixed panel 8 to withdraw the insert 41 from engagement with the fixed panel 8. While the outward pull on the hand knob is maintained and the insert 41 is not in engagement with the fixed panel 8 the shaft 33 may be rotated by rotating the control knob 35. In Fig. 4A the hand knob 36 has been pulled outwardly along the cap-type hub 37 and so that the insert 41 is out of engagement with the fixed panel 8 in order that the control knob 35 and shaft 33 may be readily rotated. The connecting wall 44 in the insert 41, in this case, has been flexed and the pressure developed therein will operate to move the wall 42 again into the position shown in Fig. 4 when the outward pull applied to the hand knob 36 is discontinued. The aperture 47 in the hand knob 36 is larger in diameter than the set screw 46 to permit the required lengthwise movement of the hand knob 36 along the cap-type hub 37.

What is claimed is:

1. A control device comprising an apertured support, a rotatable shaft extending through said support, a knob to facilitate rotation of said shaft and a yieldable, resilient tubular member in said knob engaging said support and releasable from engagement with said support by operation of said knob.

2. A control device comprising an apertured, fixed support, a rotatable shaft extending through said support, a knob to facilitate rotation of said shaft and a yieldable, resilient tubular member in said knob normally engaging said support to hold said knob and shaft against free rotation and operable to be moved out of engagement with said support by the application of an outward pull applied to said knob.

3. A control device comprising an apertured, fixed support, a rotatable shaft extending through said support, a hand knob to facilitate rotation of said shaft, a tubular member of yieldable, resilient material in said hand knob extending into contact with said support and operating as a brake means for said hand knob and shaft and said member being releasable from engagement with said support by the application of an outward pull to said hand knob.

4. A control device comprising an apertured support, a rotatable shaft extending through said support, a hand knob to facilitate rotation of said shaft and a yieldable, resilient tubular member forming a mechanical connection between said hand knob and shaft and normally engaging said support to hold said hand knob and shaft against free rotation, said member being removable from engagement with said support upon the application of an outward pull on said hand knob.

5. A control device comprising an apertured, fixed support, a rotatable shaft extending through said support, a knob for rotating said shaft, a member of yieldable, resilient material forming a mechanical connection between said knob and shaft and a portion of said member extending into pressure engagement with said support and forming a barrier around the point of extension of said shaft through said support and operating as a holding brake means to prevent free rotation of said knob and shaft, said portion being removable from contact with said support by endwise movement of said knob.

6. A control device comprising an apertured, fixed support, a rotatable shaft extending through said support, a knob to facilitate rotation of said shaft, an insert in said knob, an outer wall in said insert mechanically connected to said knob, an inner wall in said insert mechanically connected to said shaft, a yieldable and resilient connecting wall in said insert forming a connection between said outer and inner walls and a portion of said outer wall normally in pressure engagement with said support to hold said knob and shaft against free rotation, said connecting wall permitting said knob to be pulled lengthwise of said shaft to release said insert from engagement with said support and operating to restore said insert to engagement with said support when the pull in said knob is discontinued.

7. A control device comprising an apertured support, a rotatable shaft extending through said support, an apertured knob to facilitate rotation of said shaft, a hub for said knob, said hub being secured to said shaft, said knob being movable lengthwise relative to said hub, an insert of yieldable, resilient material in said knob and mechanically connected to said knob and said hub and a portion of said insert normally in pressure engagement with said support to hold said knob and shaft against free rotation, said insert being operable to be moved out of engagement with said support when an outward pull is applied to said knob.

GEORGE E. ATKINS.
EDWARD D. MEAD.

REFERENCES CITED

The following references are of record in the file of this patent:

UNITED STATES PATENTS

| Number | Name | Date |
|---|---|---|
| 1,477,785 | Szukalski | Dec. 18, 1923 |